(12) United States Patent
Lynn et al.

(10) Patent No.: US 9,485,633 B2
(45) Date of Patent: Nov. 1, 2016

(54) MESSAGE TIMESTAMP RE-ALIGNMENT FOR MESSAGE THREAD CONSISTENCY ACROSS MULTIPLE DEVICES

(71) Applicant: CELLCO PARTNERSHIP, Basking Ridge, NJ (US)

(72) Inventors: Ian Lynn, Berkeley, CA (US); Amir Mayblum, Walnut Creek, CA (US); Zhijian Lin, Dublin, CA (US); Jerry Kupsh, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 408 days.

(21) Appl. No.: 14/101,025

(22) Filed: Dec. 9, 2013

(65) Prior Publication Data

US 2015/0163647 A1    Jun. 11, 2015

(51) Int. Cl.
*H04W 4/00* (2009.01)
*H04W 4/14* (2009.01)
*H04L 12/18* (2006.01)

(52) U.S. Cl.
CPC ............ *H04W 4/14* (2013.01); *H04L 12/1813* (2013.01)

(58) Field of Classification Search
CPC ........................... H04W 4/14; H04M 3/42382
USPC ........................................................ 455/466
See application file for complete search history.

(56) References Cited

U.S. PATENT DOCUMENTS

| | | | | |
|---|---|---|---|---|
| 6,856,804 B1* | 2/2005 | Ciotta | ..................... | H04W 8/22 370/310 |
| 7,487,220 B1* | 2/2009 | Mahawadiwar | ....... | G06Q 10/10 709/206 |
| 2006/0245431 A1* | 11/2006 | Morris | ................ | H04L 12/2854 370/395.4 |
| 2010/0031306 A1* | 2/2010 | Pandey | .............. | H04N 7/17318 725/131 |
| 2012/0058776 A1* | 3/2012 | Ligeret | ............... | H04L 12/5895 455/456.1 |

\* cited by examiner

*Primary Examiner* — Timothy Pham

(57) ABSTRACT

Systems and methods for message timestamp re-alignment for message thread consistency across multiple devices are disclosed. In some implementations, an outbound message originating at a mobile phone is received at an integrated messaging server. The outbound message is associated with a messaging protocol. A timestamp representing a send time for the outbound message associated with the messaging protocol at the mobile phone is determined, at the integrated messaging server, by receiving an indication of the send time from the mobile phone. The outbound message and the timestamp are stored at the integrated messaging server. The outbound message and the timestamp representing the send time for the outbound message are provided from the integrated messaging server to a client computing device different from the mobile phone.

20 Claims, 4 Drawing Sheets

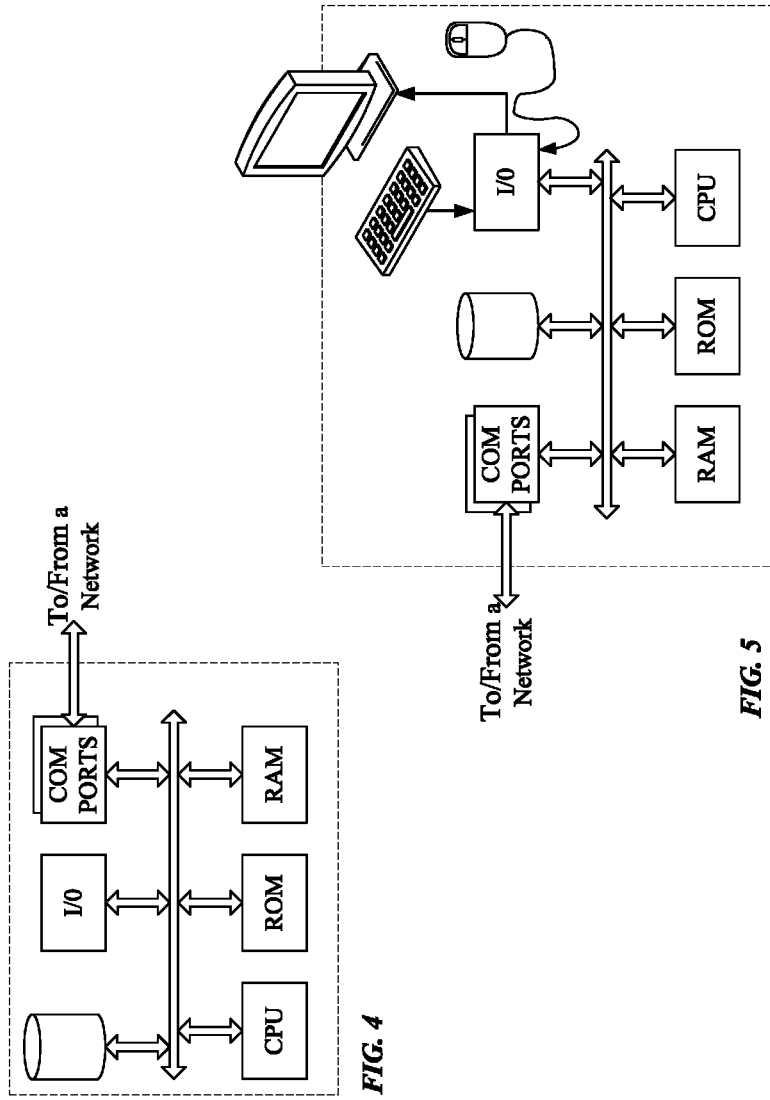

US 9,485,633 B2

MESSAGE TIMESTAMP RE-ALIGNMENT FOR MESSAGE THREAD CONSISTENCY ACROSS MULTIPLE DEVICES

BACKGROUND

Traditionally, mobile phones have been used to send and receive short messaging service (SMS) or multimedia messaging service (MMS) messages. The SMS or MMS messages may be stored at the mobile phone and associated with a timestamp when the transmission of the message is requested at the mobile phone or when the message is received at the mobile phone. However, in recent years, some telephone companies have created interfaces allowing users to send or receive SMS or MMS messages from a tablet computer running a messaging application or from a web access device (e.g., a laptop or desktop computer or an Internet kiosk) including a browser that can access the user's account via a webpage of the telephone company. In some interfaces, whether at the mobile phone, the tablet computer, or the web access device, the SMS or MMS messages are presented in reverse chronological order. In other words, newer messages, associated with a later timestamp, may be presented above older messages associated with an earlier timestamp. Due to programming of the integrated messaging server, which may be difficult to modify and which was originally designed to create timestamp(s) for message(s) without relying on information stored externally to the integrated messaging server, the timestamp for an SMS or MMS message presented at the tablet computer or web access device corresponds to a time when the SMS or MMS message was received at an integrated messaging server of the telephone company due to a limitation of how the SMSC/MMSC works with the mobile phone. The timestamp on the mobile phone and SMSC/MMSC is generated when the message is sent/received on the mobile phone or the SMSC/MMSC, respectively. The timestamp on the integrated messaging server is the time the message passes through the SMSC/MMSC, not when the message is delivered to the mobile phone. For example, the mobile is turned off. The message arrives to SMSC/MMSC at 1:00 pm. The mobile phone is turned on at 1:30 pm and the SMSC/MMSC delivers the message. The mobile phone has a timestamp of 1:30 while Integrated Messaging Server has a timestamp of 1:00.

However, the timestamp for the same SMS or MMS message presented at the mobile phone, implementing the SMS or MMS protocol, corresponds to a time when sending the message was requested at the mobile phone or when the message was received at the mobile phone due to the SMS and MMS standards and the design of the SMS Center or MMS Center, which was created several years ago and may be difficult to modify. When the mobile phone is connected to the network and an outgoing SMS or MMS message is sent via the mobile phone or via a device (e.g., a tablet computer or a web access device) associated with the telephony account of the mobile phone, the integrated messaging server may be notified of the outgoing SMS or MMS message at approximately the same time (e.g., within the same minute) as the sending request is made at the mobile phone. Similarly, when the mobile phone is connected to the network and an inbound SMS or MMS message is directed to the mobile phone, the same integrated messaging server may be notified of the inbound SMS or MMS message at approximately the same time as the mobile phone. As a result, the timestamps stored at the integrated messaging server and at the mobile phone may be consistent, and a consistent ordering of the SMS messages may be provided at different devices.

In some cases, the mobile phone may be disconnected from the network, for example, when the mobile phone travels outside of a coverage area, has its network radio turned off (e.g., in airplane mode), or is powered off. If a SMS or MMS message directed to the mobile phone is received at a SMS Center or a MMS Center, the SMS or MMS message may be provided to the integrated messaging server in real-time and provided to the mobile phone by the SMS/MMS Center after the mobile phone reconnects to the network. The message may be associated at each of the integrated messaging server, the tablet computer, and the web access device with a timestamp corresponding to a time of receipt at the integrated messaging server but at the receiving mobile phone with a timestamp corresponding to a time of receipt at the receiving mobile phone. Similarly, if a user of the mobile phone requests, via the mobile phone, sending of a SMS or a MMS message while the mobile phone is disconnected from the network, the message may be associated, at the sending mobile phone, with a timestamp corresponding to the time when the sending was requested by the user. However, the message may be associated, at the integrated messaging server, with a timestamp corresponding to a time when the sending mobile phone reconnects to the network and the transmission takes place. As a result, timestamp(s) of message(s) stored at the mobile phone may be different from timestamp(s) of message(s) stored at the integrated messaging server.

Due to the different timestamp(s) at the mobile phone and the integrated messaging server, the order of messages presented at the mobile phone may be different from the order of messages presented at device(s) connected to the integrated messaging server, such as the tablet computer or the web access device. As the foregoing illustrates, a new approach for ensuring message timestamp consistency across devices may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a simplified functional block diagram of a computer that may be configured to function as one or more of the SMSC/MMSC, the integrated messaging server, or the device push server shown in FIG. 1; and FIG. 5 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for ensuring message timestamp consistency across devices. According to some implementation, if sending of a SMS or MMS message is requested from an originating mobile phone while the originating mobile phone is disconnected from the network, the SMS or MMS message is sent when the originating mobile phone reconnects to the network. A timestamp corresponding to the time when sending of the message was requested is stored at the originating mobile phone in association with the message. The timestamp associated with the message at the originating mobile phone is provided to the integrated messaging server and stored at the integrated messaging server so that the time is that of when the message was requested to be sent rather than the time the message was actually sent by the mobile phone or received at the integrated messaging server. In this manner, the consistency of timestamp(s) of message(s) between the integrated messaging server and the originating mobile phone is ensured. The integrated messaging server can enforce this consistency between all connected devices to Integrated Messaging account. The originating and destination mobile phones may be different and not connected. The timestamp synchronization between the originating phone and the connected devices can be enforced through the integrated messaging server. However, the destination mobile phone has no relationship with the account of the originating mobile phone and thus will have a timestamp of its own independent of the originating mobile phone. Similarly, if a SMS or MMS message associated with the account of the destination mobile phone is received at the integrated messaging server while the destination mobile phone is disconnected from the network, the integrated messaging server stores a timestamp, corresponding to a time when the message was received at the integrated messaging server, in association with the message and in a memory or data store corresponding to the integrated messaging server. The timestamp of the message at the integrated messaging server is provided to the destination mobile phone and stored at the destination mobile phone so that the time is that of when the message was received at the integrated messaging server than the time the message was delivered to the destination mobile phone. As a result, consistency of timestamp(s) of message(s) between the integrated messaging server and the destination mobile phone is ensured.

Figure 1:
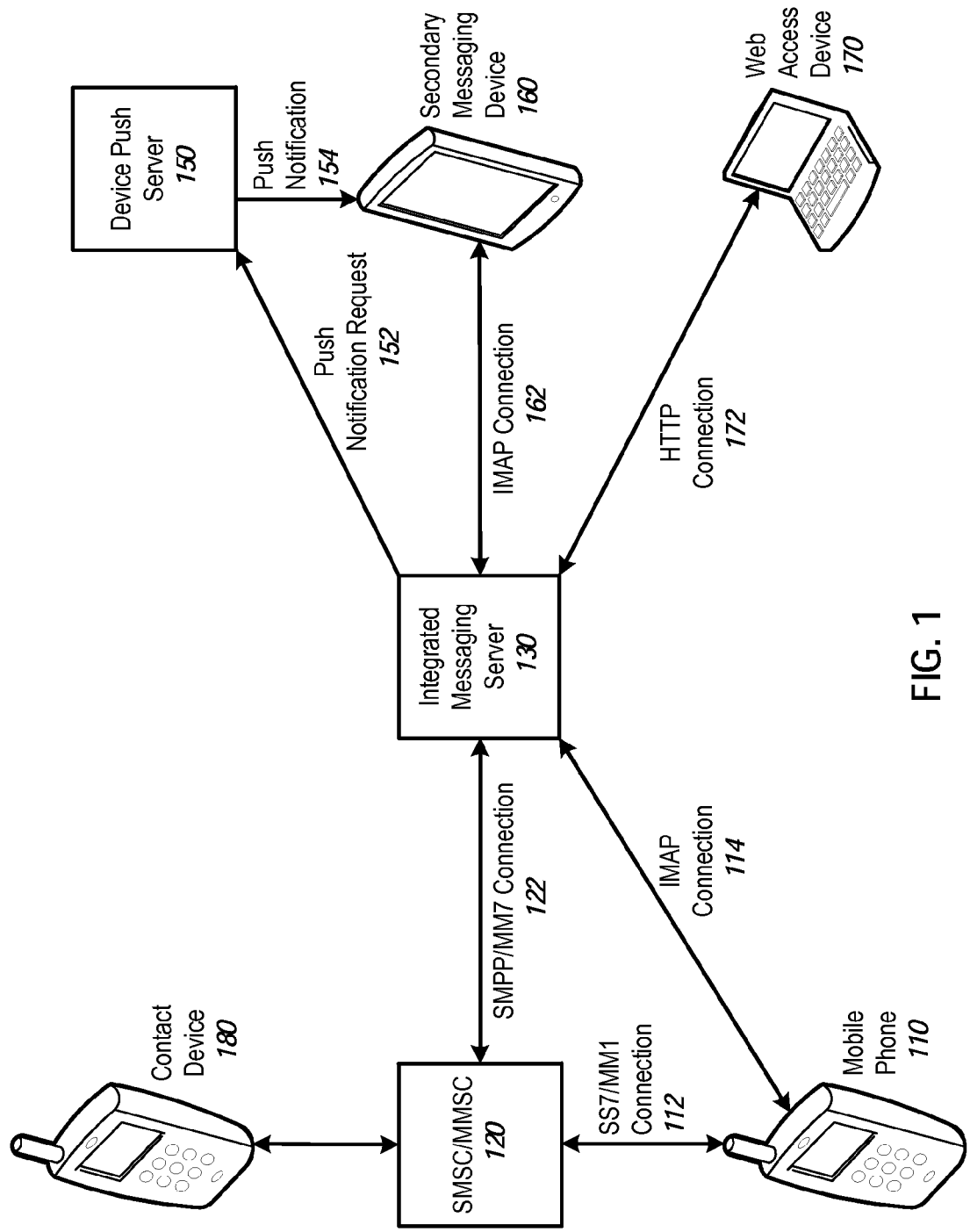
FIG. 1 illustrates an exemplary mobile messaging system.

FIG. 1 illustrates an exemplary mobile messaging system 100. The mobile messaging system may be used for sending short messaging service (SMS) or multimedia messaging service (MMS) messages according to some implementations of the subject technology. As shown, the mobile messaging system 100 includes a mobile phone 110, a SMS Center/MMS Center (SMSC/MMSC) 120, an integrated messaging server 130, a device push server 150, a secondary messaging device 160, a web access device 170, and a contact device 180. The mobile phone 110, the secondary messaging device 160, and the web access device 170 may be associated with the same account at a telephone company. For example, a user, John Q. Sample, may own mobile phone 110 and use his secondary messaging device 160 and his web access device 170 (e.g., a computer having a web browser) to access his/her account with a telephone company that provides service for the mobile phone 110. The secondary messaging device 160 may be a tablet computer (e.g., iPad®) or a personal digital music player (e.g., iPod®).

The mobile phone 110 is configured to send and receive SMS or MMS messages. The SMS or MMS messages may be directed to or received from the contact device 180, via the SMSC/MMSC 120 using the Signaling System No. 7/Multimedia Messaging No. 1 (SS7/MM1) connection 112 of the mobile phone 110 to the SMSC/MMSC 120. The contact device 180 may be any mobile phone configured to communicate via SMS or MMS or a service that provides information (e.g., stock quotes or weather forecasts) via SMS or MMS. According to some examples, the contact device 180 is a mobile phone associated with a telephone company different from the telephone company of the mobile phone 110, and the telephone company of the mobile phone 110 lacks information regarding whether the contact device 180 is connected to a network or how the message is processed, at the contact device 180, after transmission of the message to the contact device 180 using the SMS or MMS protocol.

The mobile phone 110 is also configured to communicate with the integrated messaging server 130 via an Internet Messaging Access Protocol (IMAP) connection 114. The IMAP connection may be used to synchronize data between the integrated messaging server 130 and the mobile phone 110 or to send and/or receive messages from the mobile phone via an Internet Protocol. The IMAP connection 114 is automatically established, using software in the mobile phone 110, when the mobile phone 110 is connected to the Internet, for example, using a WiFi network or an Internet-enhanced cellular network (e.g., a 3G or 4G network). Using the IMAP connection 114, the mobile phone 110 is able to synchronize SMS an MMS messages stored at the mobile phone 110 with SMS and MMS messages stored at the integrated messaging server 130. For example, the mobile phone 110 and the integrated messaging server 130 may both store the SMS message, "Please pick me up at the train station," after receiving this message via the SMSC/MMSC 120. After picking up the sender of the SMS message, the user of the mobile phone may delete the SMS message. The deletion may be forwarded to the integrated messaging server 130 via the IMAP connection 114, and the SMS message may also be deleted from the integrated messaging server. Alternatively, the user may use the secondary messaging device 160 to delete the SMS message, causing the deletion to take place at the integrated messaging server 130. The integrated messaging server 130 may transmit an instruction for deleting the message, via the IMAP connection 114, to the mobile phone 110, causing the message to be deleted at the mobile phone 110.

The SMSC/MMSC is connected to the integrated messaging server 130 using a Short Message Peer-to-Peer/Multimedia Messaging No. 7 (SMPP/MM7) connection 122. The SMPP/MM7 connection 122 provides the integrated messaging server 130 with a copy of each SMS or MMS message sent to or from the mobile device 110 via the SMSC/MMSC 120. The integrated messaging server 120 maintains the copies of the SMS or MMS messages and provides the SMS or MMS messages to the secondary messaging device 160 and to the web access device 170, using the connections 152, 154, 162, or 172, allowing the user to review his/her SMS or MMS messages from the secondary messaging device 160 or the web access device 170.

The integrated messaging server 130 verifies that accounts at the integrated messaging server 130 correspond to accounts of users of the telephone company and facilitates creation and deletion of accounts at the integrated messaging server 130. For example, an account may be created at the integrated messaging server 130 when a user registers for service with the telephone company and the account may be deleted when the user closes his/her account or if the user fails to pay for service.

The device push server 150 is programmed to send push notification(s) to the secondary messaging device 160 (e.g., pop-up notifications or badge notifications at a top of a screen, as configured by a user of the secondary messaging device 160 via a settings menu of the secondary messaging device 160). The device push server 150 may be a server provided by a manufacturer of the secondary messaging device 160 (e.g., Apple® for an iOS® device, such as an iPad® or an iPod Touch®, or Google® for an Android® tablet) for providing push notifications to the secondary messaging device 160 from various applications installed on the secondary messaging device 160 (e.g., an email application, a newspaper application, a banking application, a stock price notification application, etc.). As illustrated in FIG. 1, the integrated messaging server 130 sends a push notification request 152 to the secondary messaging device 160 upon receiving a SMS or MMS message from the SMSC/MMSC 120. In response, the device push server 150 sends a push notification 154 to the secondary messaging device 160. Using the device push server 150, the secondary messaging device 160 may receive a push notification when the mobile phone 110 receives a SMS or MMS message, similar to the push notification received at the mobile phone 110 in these circumstances. The IMAP connection 162 is used when message(s) are composed or edited (e.g., deleted) at the secondary messaging device 160.

The web access device 170 may access SMS and/or MMS messages stored at the integrated messaging server 130 using a hypertext transfer protocol (HTTP) connection 172. For example, the SMS and/or MMS messages may be provided via a web page accessible via the web access device 170. The user may be required to provide authentication information (e.g., a username and a password) to access the web page. The authentication information may be established when the user creates an account with the integrated messaging server 130, for example, upon opening a telephony account with the telephone company.

Below, use cases for synchronizing timestamp(s) of message(s) between the mobile phone 110, the integrated messaging server 130, and device(s) 160 or 170 connected to the integrated messaging server 130, when the mobile phone 110 is disconnected from the network are described.

Use Case 1: The mobile phone 110 generates an outbound message while the mobile phone 110 is disconnected from the network.

A user of the mobile phone 110 creates a SMS or MMS message 110 and requests sending of the SMS or MMS message to a contact device 180, for example, by pressing a "send" button, while the mobile phone 110 is disconnected from the network. The mobile phone 110 associates, with the message, a timestamp corresponding to a time when the sending of the message was requested. When the mobile phone reconnects to the network, the message is transmitted from the mobile phone 110 to the SMSC/MMSC 120 via the SS7/MM1 connection 112. The SMSC/MMSC 120 then forwards the message to the contact device 180. The SMSC/MMSC 120 also provides a copy of the message to the integrated messaging server 130, via the SMPP/MM7 connection 122. At the mobile phone 110, the message may include the timestamp or be associated with the timestamp. In other words, the message may be presented as having been sent at the time corresponding to the timestamp. For example, a message, "How are you doing," sent from the mobile phone 110, may be presented at the mobile phone 110 as having been sent at 7:12 PM on Oct. 1, 2013, where the timestamp associated with the message corresponds to 7:12 PM on Oct. 1, 2013 (the same time). However, in some cases, due to the SMS/MMS standard, the programming of the SMSC/MMSC 120, or the programming of the SS7/MM1 connection 112, which may have been developed several years ago before the popularization of web-based SMS/MMS interfaces or secondary messaging devices, such as tablet computers, the SMSC/MMSC 120 may not be able to process the timestamp or the timestamp may not be able to be transmitted using the SS7/MM1 connection 112. As a result, the timestamp may be removed from the message at the mobile phone 110 or the message may be transmitted from the mobile phone 110 without the timestamp to the SMSC/MMSC 120 and to the contact device 180. Depending on the programming of the SMSC/MMSC 120, the SMSC/MMSC 120 may not transmit a timestamp with a message at all or may transmit an incorrect timestamp associated with the time the mobile phone 110 reconnected to the network and transmitted the message, not the time when the message was composed and transmission of the message was requested by the mobile phone 110.

The integrated messaging server 130 receives, from the mobile phone 110 and via the IMAP connection 114, the timestamp corresponding to the send time of the message. The integrated messaging server 130 may also receive a timestamp for the message from the SMSC/MMSC 120. However, the timestamp from the SMSC/MMSC 120 may be ignored if it is inconsistent with the timestamp from the mobile phone 110. For each message received at the integrated messaging server 130 from the mobile phone 110 or received at the integrated messaging server 130, the SMSC/MMSC 120 and associated with an account (e.g., identified by a mobile directory number) of the mobile phone 110, the integrated messaging server 130 may query the mobile phone 110 for the timestamp of the message, or the mobile phone 110 may automatically provide the timestamp to the integrated messaging server 130 without being queried. In some cases, the integrated messaging server 130 always asks for the timestamp from the mobile phone 110. Alternatively, after receiving a message from SMSC/MMSC 120 the integrated messaging server 130 may determine whether the mobile phone 110 was disconnected from the network for a period of time, for example, since the last time a message was received from the mobile phone 110, excluding messages received relatively simultaneously, such as, within a one second interval. The integrated messaging server 130 may determine whether the mobile phone 110 was disconnected from the network for a period of time by sending a query to the mobile phone 110 or by checking connection records of the telephone company stored at the integrated messaging server 130. Either the mobile phone 110 or the integrated messaging server 130 may store the connection records of the mobile phone 110. If the mobile phone 110 was disconnected from the network for some time, the integrated messaging server 130 may ask for the timestamp from the mobile phone 110. In some examples, a clock of the mobile phone 110 may provide an incorrect time (e.g., the clock of the mobile phone 110 may be set to display the time in Los Angeles when the mobile phone is located in New York City, where the time in Los Angeles is different from the time in New York City). The integrated messaging server 130 may determine, using the clock of the mobile phone 110, an amount of time elapsed since the mobile device requested sending of the message. This determination may be made by querying the mobile device 110 or by receiving a message from the mobile device 110 without querying. The integrated messaging server 130 may generate the timestamp based on the current time and the amount of time elapsed. After receiving the message from the SMSC/MMSC 120 and the timestamp from the mobile phone 110, the integrated messaging server 130 forwards the message and the timestamp to the secondary messaging device 160 via the IMAP connection 162 and to the web access device 170 via the HTTP connection 172. After the above process is completed, the message is associated with the same timestamp, representing the time the user of the mobile phone 110 requested sending of the message, in each of the mobile phone 110, the integrated messaging server 130, the secondary messaging device 160, and the web access device 170. According to some implementations, the integrated messaging server 130 stores the timestamp in a predetermined time zone format, for example, Greenwich Mean Time (GMT). The SMS standard does not include a time zone in the messages, because storing the time zone would have taken extra space in the text message that was limited to a predetermined number of characters (e.g., 160 characters).

Use Case 2: A device different from the mobile phone 110 generates a message while the mobile phone 110 is disconnected from the network.

A SMS or MMS message for the account associated with the mobile phone 110 is received at the integrated messaging server 130 while the mobile phone 110 is disconnected from the network. The secondary messaging device 160 and the web access device 170 may be either connected to the network or disconnected from the network. The message could be composed by the user of the account via either the secondary messaging device 160 or the web access device 170, and transmitted to the integrated messaging server via the IMAP connection 162 or the HTTP connection 172. Alternatively, the message could be generated at the contact device 180 and transmitted, via the SMS or MMS protocol, to the SMSC/MMSC 120. The SMSC/MMSC 120 then provides a copy of the message to the integrated messaging server 130. In another alternative, the message could be generated via an account associated with the contact device 180, for example, at a secondary messaging device or a web access device coupled to an integrated messaging server of a telephone company of the contact device 180, and delivered to the SMSC/MMSC 120 with a "from" address indicating that the message is from the contact device 180.

Upon receiving the message, the integrated messaging server 130 stores the message at the integrated messaging server 130 in conjunction with a timestamp representing the time the message was received at the integrated messaging server 130 (regardless of whether the secondary messaging device 160 or the web access device 170 is connected to the integrated messaging server 130). When the mobile phone 110 reconnects to the network, the message is transmitted to the mobile phone 110 either from the SMSC via the SS7/MM1 connection 112 or from the integrated messaging server 130 via the IMAP connection 114. The timestamp for the message is transmitted to the mobile phone 110 from the integrated messaging server 130 via the IMAP connection 114. The timestamp is stored in conjunction with the message. The mobile phone may associate the message with the timestamp transmitted from the integrated messaging server 130 and ignore all other timestamps. In some cases, there may be a discrepancy between the timestamps associated with the message at the sending and receiving devices, as the sending device may associate the message with the time when the message was requested to be sent and the receiving device may associate the message with the time when the message was received at the integrated messaging server 130. It should be noted that, in the standard SMS/MMS protocol there may also be a discrepancy between the timestamps associated with the message at the sending and receiving devices, as the sending device associates the message with the timestamp when the message was transmitted from the sending device according to the clock of the sending device and the receiving device associates the message with the time when the message was received at the receiving device according to the clock of the receiving device. According to some examples, the sending and receiving devices are independent of one another and do not share timestamps. The sending and receiving devices may have different timestamps if a message on a receiving device is delayed due to network conditions. Message timestamps between sending and receiving devices may be similar under ideal conditions, when both the sending and receiving devices are connected to the network and messages are transmitted from the sending device to the receiving device within a few seconds of the user of the sending device requesting the transmission.

The subject technology is described above in conjunction with the SMSC/MMSC 120 handling SMS and/or MMS messages. However, the subject technology may be implemented using any messaging protocol, not necessarily SMS or MMS. Similarly, as shown in FIG. 1, the integrated messaging server 130 uses IMAP and HTTP connections to communicate with the user's computing devices 110, 160, and 170. However, any other communication protocol may be used in place of IMAP or HTTP.

Figure 2:
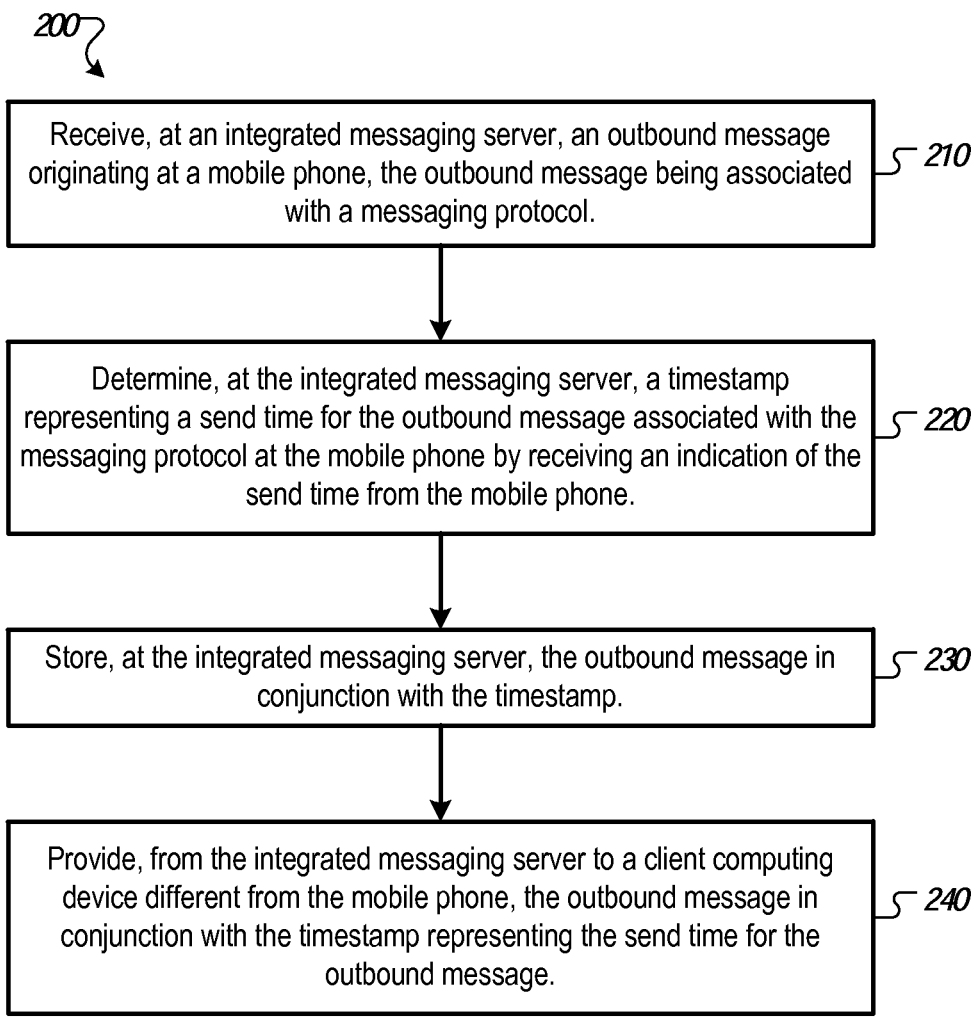
FIG. 2 illustrates an exemplary process for processing, at an integrated messaging server, an outbound message originating at a mobile phone.

FIG. 2 illustrates an exemplary process 200 for processing, at an integrated messaging server (e.g., integrated messaging server 130), an outbound message originating at a mobile phone (e.g., mobile phone 110).

The process 200 begins at step 210, where an integrated messaging server (e.g., integrated messaging server 130) receives an outbound message originating at a mobile device (e.g., mobile device 110). The outbound message is associated with a messaging protocol, for example, SMS, MMS, or any other messaging protocol. The integrated messaging server may receive the message from the mobile phone using an IMAP connection (e.g., IMAP connection 114) between the mobile phone and the integrated messaging server, or using any other connection or protocol. Alternatively, the integrated messaging server may receive the message from a SMSC/MMSC (e.g., SMSC/MMSC 120), and the SMSC/MMSC may receive the message from the mobile phone.

In step 220, the integrated messaging server determines a timestamp representing a send time for the outbound message associated with the messaging protocol at the mobile phone by receiving an indication of the send time from the mobile phone. The indication of the send time may be received via an IMAP connection or via any other connection. The indication of the send time may correspond to a time when sending of the outbound message was requested at the mobile phone (e.g., a time when the user of the mobile phone pressed the "send" button). The indication of the send time may include the send time, as measured by a clock of the mobile phone (e.g., Sep. 1, 2013, 5:23:13 PM) or an amount of time elapsed since the send time (e.g., 45 minutes and 27 seconds).

The send time may be different from the time when the outbound message is received at the integrated messaging server, as the mobile phone may not be connected to a network at the send time. In some cases, a time difference between the send time and the time when the outbound message is received at the integrated messaging server may exceed a time difference associated with traversing a network, which may be determined at the integrated messaging server based on a network connection speed. This may happen, for example, if the mobile phone is disconnected from the network at the send time. The integrated messaging server may query the mobile phone for the send time or the amount of time elapsed since the send time of the outbound message via the IMAP connection or via another connection in order to determine the time when sending the message was requested at the mobile phone (not necessarily the time when the message was actually sent from the mobile phone due to the mobile phone being disconnected from the network when sending the message was requested). The sending of the message may be requested at an earlier time than when the message is transmitted. For example, a user of a mobile phone may create a SMS message and request sending of the message at 6:00 PM while the user is on an airplane and the mobile phone is disconnected from the network. At 7:00 PM, the airplane may land and the mobile phone may reconnect to the network and transmit the message, the sending of which was requested at 6:00 PM. Alternatively, the mobile phone may be programmed to automatically provide the send time or the amount of time elapsed since the send time to the integrated messaging server without having the integrated messaging server query the mobile phone.

In step 230, the integrated messaging server stores, in a local memory or a data store associated with the integrated messaging server, the outbound message in conjunction with the timestamp. The outbound message may be stored in a portion of the memory or data store associated with a telephony account of the user of the mobile phone and may be accessible to the user of the mobile phone in response to the user providing appropriate login credentials (e.g., a username or a password). The user may opt-out of having the integrated messaging server store his/her messages, for example, by modifying the setting on his/her mobile phone or on his/her online telephony account to prevent the integrated messaging server from storing his/her messages. Also, the user affirmatively provides permission for the integrated messaging server to store his/her messages by registering with the telephone company to view his/her mobile messaging service via a tablet computer (e.g., secondary messaging device 160) or a web access device (e.g., web access device 170).

In step 240, the integrated messaging server provides, to a client computing device (e.g., secondary messaging device 160 or web access device 170) different from the mobile phone, the outbound message in conjunction with a timestamp representing the send time for the outbound message. The client computing device may be a tablet computer associated with the telephony account of the user of the mobile phone. For example, the tablet computer may include an application for accessing the telephony account of the user of the mobile phone. Alternatively, the client computing device may include a web browser accessing a webpage for presenting information associated with the telephony account of the user of the mobile phone. The user may, in some cases, be required to provide authentication information (e.g., a username and a password) in order to access the telephony account. After step 240, the process 200 ends.

As described above, the steps 210-240 of the process 200 are implemented in a certain order and in series. However, the steps 210-240 of the process 200 may be implemented in any order. In some aspects, two or more of the steps 210-240 are implemented in parallel.

Figure 3:
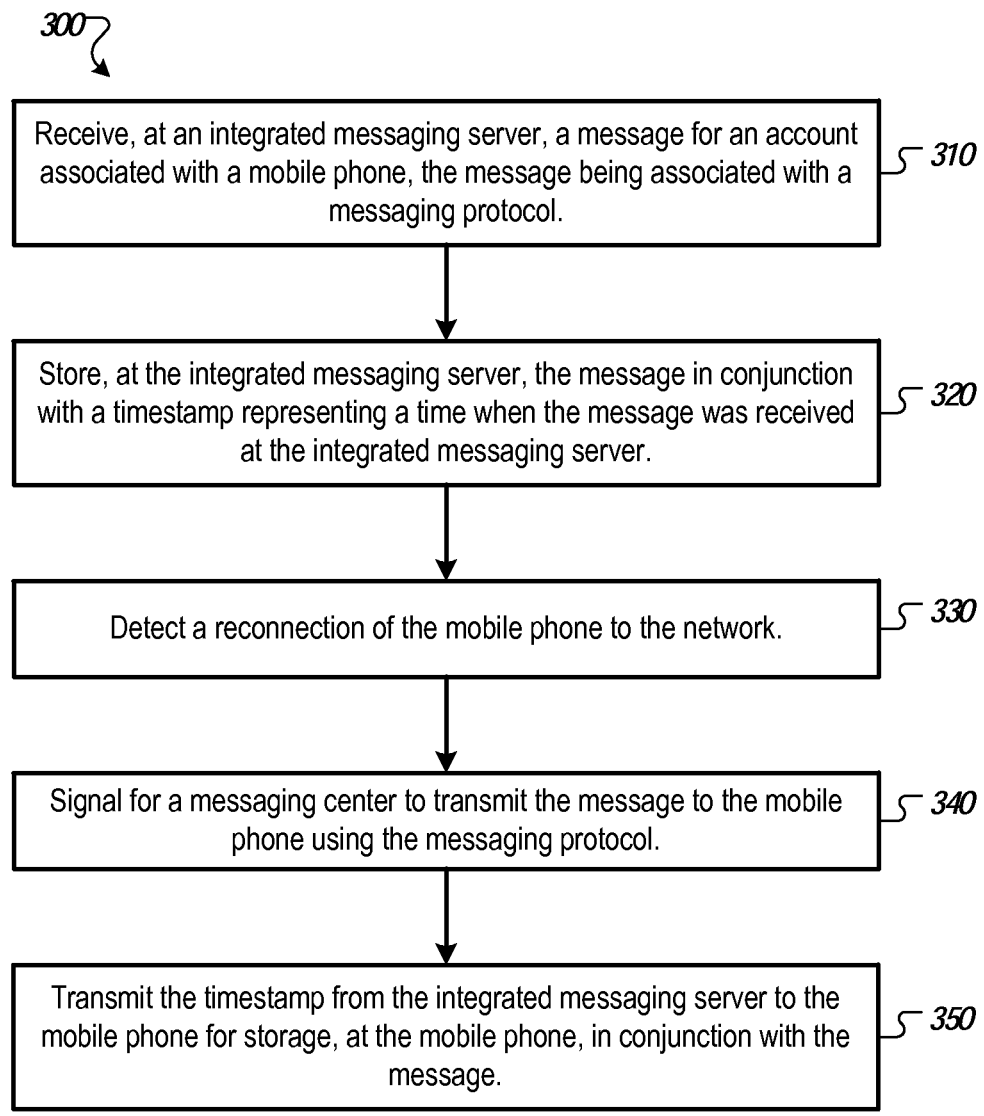
FIG. 3 illustrates an exemplary process for processing, at an integrated messaging server, a message for an account associated with a mobile phone.

FIG. 3 illustrates an exemplary process 300 for processing, at an integrated messaging server, a message for an account associated with a mobile phone. The process 300 begins at step 310, where an integrated messaging server (e.g., integrated messaging server 130) receives a message from an account associated with a mobile phone (e.g., mobile phone 110). The message is associated with a messaging protocol, for example, SMS, MMS, or any other messaging protocol. In some cases, the message is an outbound message from an account of the user of the mobile phone. The message did not originate at the mobile phone and, instead, originated another client computing device (e.g., secondary messaging device 160 or web access device 170) associated with the telephony account of the user of the mobile phone. The integrated messaging server may receive the message from the other computing device using an IMAP or HTTP connection to the other computing device.

Alternatively, the message may be an inbound message, directed to the mobile phone or a telephony account associated with the mobile phone, an originating from a contact device (e.g., contact device 180). The contact device may be a mobile phone different from the mobile phone 110 or a service that provides information (e.g., weather forecast, stock quote, "joke of the day," etc.) via the messaging protocol (e.g., SMS, MMS, or any other messaging protocol). The message may be transmitted from the contact device to a messaging center (e.g., SMSC/MMSC 120), and from the messaging center to the integrated messaging server. The messaging center may also attempt to transmit the message to the mobile phone.

In step 320, the integrated messaging server stores, in a local memory or a data store associated with the integrated messaging server, the message in conjunction with a timestamp. The timestamp represents a time when the message was received at the integrated messaging server. The time when the message was received at the integrated messaging server may be measured using a network clock or a local clock of the integrated messaging server.

In step 330, the integrated messaging server detects a reconnection of the mobile phone to the network. For example, the messaging center may successfully transmit the message to the mobile phone and notify the integrated messaging server that the message was successfully transmitted. Alternatively, the integrated messaging server may successfully ping the mobile phone and determine, based on the successful ping, that the mobile phone is reconnected to the network.

In step 340, the integrated messaging server signals for the messaging center to transmit the message to the mobile phone using the messaging protocol. The messaging center may transmit the message to the mobile phone using SMS, MMS, or any other messaging protocol. The mobile phone may receive the message from the messaging center.

In step 350, the integrated messaging server transmits the timestamp to the mobile phone for storage, at the mobile phone, in conjunction with the message. The integrated messaging server may use a messaging protocol different from that of the messaging center to communicate with the mobile phone. For example, the integrated messaging server may use IMAP to communicate with the mobile phone, while the messaging center uses SMS or MMS to communicate with the mobile phone.

As described above, the steps 310-350 of the process 300 are implemented in a certain order and in series. However, the steps 310-350 of the process 300 may be implemented in any order. In some aspects, two or more of the steps 310-350 are implemented in parallel.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 5). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of message timestamp realignment outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the processes described herein and shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at an integrated messaging server, a message associated with a messaging protocol and originating at a mobile device based on a request by a user of the mobile device to send the message, the request made by the user at a time when the mobile device was disconnected from a cellular network;
   determining, at the integrated messaging server, a timestamp representing a send time for the message associated with the messaging protocol at the mobile device by receiving an indication of the send time from the mobile device, wherein the send time for the message corresponds to the time when the mobile device was disconnected from the cellular network and the user made the request to send of the message, and wherein the send time for the message is different from a time when the message was received at the integrated messaging server;
   storing, at the integrated messaging server, the message and the timestamp; and
   providing, from the integrated messaging server to a client computing device different from the mobile device, the message and the timestamp representing the send time for the message.

2. The method of claim 1, wherein the messaging protocol includes a short messaging service (SMS) messaging protocol or a multimedia messaging service (MMS) messaging protocol, and wherein the message is received at the integrated messaging server from an SMS Center (SMSC) or an MMS Center (MMSC).

3. The method of claim 1, wherein determining the send time for the message associated with the messaging protocol at the mobile device comprises:
   querying, via an Internet Message Access Protocol (IMAP) connection between the mobile device and the integrated messaging server, the mobile device for the send time for the message.

4. The method of claim 3, wherein the send time for the message corresponding to the time when the mobile device was disconnected from the cellular network and the user made the request to send the message is determined by the mobile device based on a clock of the mobile device when the user made the request to send the message.

5. The method of claim 3, wherein the send time for the message corresponding to the time when the mobile device was disconnected from the cellular network and the user made the request to send the message is determined by the integrated messaging server based on a clock of the integrated messaging server when the user made the request to send the message, the method further comprising:
   receiving, at the integrated messaging server from the mobile device, information indicating a time difference between a current time and the time when the mobile device was disconnected from the cellular network and the user made the request to send the message; and
   computing, by the integrated messaging server, the send time based on the time difference and the current time according to the clock of the integrated messaging server.

6. The method of claim 1, wherein determining the send time for the message associated with the messaging protocol at the mobile device comprises:
   receiving, at the integrated messaging server and from the mobile device via an Internet Message Access Protocol (IMAP) connection, the send time for the message without querying the mobile device for the send time for the message.

7. The method of claim 1, wherein the client computing device comprises a tablet computer associated with a same telephony account as the mobile device.

8. The method of claim 1, wherein the client computing device comprises a web browser accessing a webpage for presenting information associated with a telephony account corresponding to the mobile device.

9. A method comprising:
   receiving, at an integrated messaging server, a message associated with a messaging protocol, the message received for an account associated with a mobile device that was disconnected from a network at a time that the message was received at the integrated messaging server, the message originating on another device other than the mobile device based on a request by a user of the other device to send the message;
   storing, at the integrated messaging server, the message and a timestamp representing the time that the message was received at the integrated messaging server;
   detecting a reconnection of the mobile device to the network;
   signaling for a messaging center to transmit the message to the mobile device using the messaging protocol; and
   transmitting the timestamp from the integrated messaging server to the mobile device for storage at the mobile device with the message.

10. The method of claim 9, wherein the messaging protocol includes a short messaging service (SMS) messaging protocol or a multimedia messaging service (MMS) messaging protocol, and wherein the messaging center includes an SMS Center (SMSC) or an MMS Center (MMSC).

11. The method of claim 9, wherein transmitting the timestamp from the integrated messaging server to the mobile device includes transmitting the timestamp using Internet Message Access Protocol (IMAP), and wherein the messaging protocol is different from IMAP.

12. The method of claim 9, wherein the message comprises an inbound message directed to the account associated with the mobile device, and wherein the inbound message is received, at the integrated messaging server, from the messaging center.

13. The method of claim 9, wherein:
the message originating on the other device other than the mobile device comprises an outbound message from the account associated with the mobile device; and
the other device other than the mobile device comprises a client computing device associated with the account.

14. The method of claim 13, wherein the message is received, at the integrated messaging server, via an Internet Message Access Protocol (IMAP) or a Hypertext Transfer Protocol (HTTP) connection with the client computing device.

15. A non-transitory computer-readable medium comprising instructions which, when executed by one or more computers, cause the one or more computers to:
receive, at an integrated messaging server, a message associated with a messaging protocol, the message received for an account associated with a mobile device that was disconnected from a network at a time that the message was received at the integrated messaging server, the message originating on another device other than the mobile device based on a request by a user of the other device to send the message;
store, at the integrated messaging server, the message and a timestamp representing the time that the message was received at the integrated messaging server;
detect a reconnection of the mobile device to the network;
signal for a messaging center to transmit the message to the mobile device using the messaging protocol; and
transmit the timestamp from the integrated messaging server to the mobile device for storage at the mobile device with the message.

16. The non-transitory computer-readable medium of claim 15, wherein the messaging protocol includes a short messaging service (SMS) messaging protocol or a multimedia messaging service (MMS) messaging protocol, and wherein the messaging center includes an SMS Center (SMSC) or an MMS Center (MMSC).

17. The non-transitory computer-readable medium of claim 15, wherein the instructions to transmit the timestamp from the integrated messaging server to the mobile device include instructions to transmit the timestamp using Internet Message Access Protocol (IMAP), and wherein the messaging protocol is different from IMAP.

18. The non-transitory computer-readable medium of claim 15, wherein the message comprises an inbound message directed to the account associated with the mobile device, and wherein the inbound message is received, at the integrated messaging server, from the messaging center.

19. The non-transitory computer-readable medium of claim 15, wherein:
the message originating on the other device other than the mobile device comprises an outbound message from the account associated with the mobile device; and
the other device other than the mobile device comprises a client computing device associated with the account.

20. The non-transitory computer-readable medium of claim 19, wherein the message is received, at the integrated messaging server, via an Internet Message Access Protocol (IMAP) or a Hypertext Transfer Protocol (HTTP) connection with the client computing device.

* * * * *